United States Patent

Staiger et al.

[11] Patent Number: 6,101,438
[45] Date of Patent: Aug. 8, 2000

[54] PROCESS FOR AUTOMATICALLY CO-ORDINATING THE FILLING OPERATION OF SHIFT ELEMENTS

[75] Inventors: Kai Staiger, Friedrichshafen; Ralf Dreibholz, Meckenbeuren; Gerd Frotscher, Friedrichshafen, all of Germany

[73] Assignee: ZF Friedirchshafen AG, Friedrichschafen, Germany

[21] Appl. No.: 09/068,857

[22] PCT Filed: Dec. 5, 1996

[86] PCT No.: PCT/EP96/05436

§ 371 Date: May 19, 1998

§ 102(e) Date: May 19, 1998

[87] PCT Pub. No.: WO97/21943

PCT Pub. Date: Jun. 19, 1997

[30] Foreign Application Priority Data

Dec. 12, 1995 [DE] Germany ................. 195 46 292

[51] Int. Cl.[7] .............. F16H 61/06; B65B 3/26; B60K 41/06

[52] U.S. Cl. .............. 701/55; 701/51; 701/66; 477/50; 477/117

[58] Field of Search ................. 701/55, 51, 58, 701/64, 66; 477/50, 117, 121, 156, 158

[56] References Cited

U.S. PATENT DOCUMENTS

| | | | |
|---|---|---|---|
| 5,070,747 | 12/1991 | Lentz et al. | 74/866 |
| 5,190,084 | 3/1993 | Diehl et al. | 141/39 |
| 5,211,079 | 5/1993 | Runde et al. | 74/866 |
| 5,413,470 | 5/1995 | Eisenmann | 418/171 |

FOREIGN PATENT DOCUMENTS

| | | |
|---|---|---|
| 0 435 374 | of 0000 | European Pat. Off. . |
| 0 435 377 A2 | 7/1991 | European Pat. Off. . |
| 0 435 378 B1 | 7/1991 | European Pat. Off. . |
| 0 479 737 A1 | 4/1992 | European Pat. Off. . |
| 2 223 283 | 4/1990 | United Kingdom . |

OTHER PUBLICATIONS

"Adaptive Electronic Control of Garage Shift in an Automatic Transmission", No. 359, Mar. 1, 1994, XP000440538, p. 142.

*Primary Examiner*—Tan Nguyen
*Assistant Examiner*—Dalena Tran
*Attorney, Agent, or Firm*—Davis and Bujold

[57] ABSTRACT

A process is proposed for automatically coordinating the filling and feeding operation of hydraulically operated and hydraulically or electronically individually commanded shift elements. The filling and feeding operation is divided into a rapid filling phase and a filling equalization phase and has as parameters at least one rapid filling period, one rapid filling pressure, one filling equalization period and one filling equalization pressure. To optimize said parameters two of the four are preset and for the other two, an optimal value is determined for the first parameter to be optimized on the basis of a preset, time-dependent pressure curve in which a pressure increase phase follows the rapid filling phase and equalization phase. To this end, based on an initial value presettable in each case, the first parameter is gradually adjusted until a speed change occurs at or before the start of the pressure increase phase. For the other parameter to be optimized, at the optimal value of the first parameter to be optimized and based on the respective presettable initial value, said parameter is gradually changed until a speed change occurs before or at least approximately simultaneously with the start of the pressure increase phase.

10 Claims, 1 Drawing Sheet

PROCESS FOR AUTOMATICALLY CO-ORDINATING THE FILLING OPERATION OF SHIFT ELEMENTS

The invention concerns a process for automatically coordinating the filling and feeding operation of hydraulically or electronically individually controllable shift elements.

BACKGROUND OF THE INVENTION

In order to carry out a gearshift, in automatic transmissions with hydraulically actuated shift elements having a shifting piston moving in a piston space and placed on a disc set, the piston space, which at first is more or less filled with air, must be filled with oil before the piston is finally placed on the disc set. Said filling and feeding operation of shift elements is usually divided into a rapid filling phase and a filling equalization phase. In the rapid filling phase the shift element that operates almost completely or partly idly is filled with oil, and in the subsequent filling equalization phase the shift piston is finally placed on the disc set with less load.

It is generally known from extensive empirical tests that the precision of said operation, especially with an exactly coordinated feeding pressure, has a very great influence upon the gearshift quality.

In the practice, in transmission coordination, it has repeatedly proven problematic that the coordination parameters of the filling operation (which are determined by necessary manufacturing tolerances) differ from one transmission to another. In addition, the coordination parameters of the filling operation are also time dependent since the tolerances change as result of aging and wear through time.

For example, in the rapid filling phase, which fills the piston space (operating idly or partly idly) with oil, the necessary tolerance of the air play determined by the manufacture, that is, the path of the shift piston to the discs, together with the manufacturing tolerance, is to be regarded as a variance. If the air play increases, for example, as a consequence of disc wear, the duration of the filling phase must be extended in order to cover the additional need of oil and to exactly carry out the feeding operation.

With the former processes known from the practice, it cannot be accomplished to the extent desired to give a uniform coordination to one type of transmission.

The necessary filling equalization pressure likewise depends on a series of parameters. Thus, when using plate springs, for example, with increasing rigidity and increasing piston friction, the filling equalization pressure must be raised in order to place the shift piston exactly on the discs.

Divergences of pressure regulators also impair shifting quality, whereby a correction of the filling equalization pressure (corresponding to the divergences of pressure regulators) is required in order to bring the shift pistons, after the filing, to lie on the disc sets with a required slight load.

A uniform, single type transmission coordination thus necessarily results in gearshifts of reduced quality.

EP 0 435 377 discloses a process for regulating the change from a low velocity ratio to a high velocity ratio between the input and output shafts of an automatic transmission with shift elements, or a coupling and an uncoupling torque transmitting apparatus operated by fluid pressure. In a filling and feeding operation of the hydraulically actuated shift elements, the pressure curve is through time adapted to the transmission conditions by means of an adaptive diagram.

When the engine throttle is substantially closed, the uncoupling, torque transmitting apparatus is first disengaged by reducing its operating pressure prior to a change or modification. The coupling, torque transmitting apparatus is disengaged by applying a coupling instruction pressure for a previously defined filling period. The coupling instruction pressure, here adjusted to an initial value, is subsequently regulated in a close loop regulation period in order to effect a progressive engagement of the coupling, torque transmitting device. An increase in the coupling instruction pressure above a previously determined value during the regulation period, or a moderate filling of the coupling transmission apparatus, is detected by the measure of a velocity divergence. According to this detection either a first stored parameter, which relates to the value of the initial coupling instruction pressure, is adjusted in order to increase the initial coupling instruction pressure, or a second stored parameter, which relates to the length of the filling period, is adjusted in order to extend the filling period.

This process offers the advantage that the gearshift quality is analyzed and required adaptations regarding pressure and time in the filling period are calculated and made the basis of the subsequent gearshifts, whereby their quality is optimized.

However, this known process is disadvantageous in that a learning period is needed in all driving conditions in order to achieve an optimal operating condition. Consequently, in a new transmission, after a transmission change, or after transmission repairs, the gearshift quality is initially impaired when using said known coordination process.

In connection with this, EP 0 435 374 and EPO 0 435 378 are to be cited also since their adaptation processes also have the disadvantage that the parameter optimization acts upon the process only with definite delay due to the needed learning process.

Therefore, the invention is based on the problem of providing a process of the above mentioned kind in which the separate shift elements for each transmission are filled from the beginning using optimal parameters in order to ensure an optimal operating quality.

SUMMARY OF THE INVENTION

The process according to the invention offers the advantage that the decisive parameters for the filling and feeding operation, namely, rapid filling period, rapid filling pressure, filling equalization period and filling equalization pressure, can be exactly adjusted individually for each transmission and in accordance with the tolerance of the individual parts with the startup of the transmission. An immediate optimal operating condition is thus ensured for each transmission.

According to the process of the invention, the optimization of the filling operation in transmissions having relatively great tolerances is possible without problems.

Also, with the principle of the process of the invention, there advantageously results a controlled load take-up instead of a sensitive and costly to regulate load take-up.

BRIEF DESCRIPTION OF THE DRAWINGS

Other advantages of the invention result from the subclaims and from the embodiments that follow described with reference to the drawing. In the drawing:

DESCRIPTION OF THE PREFERRED EMBODIMENT(S)

Figure 1:
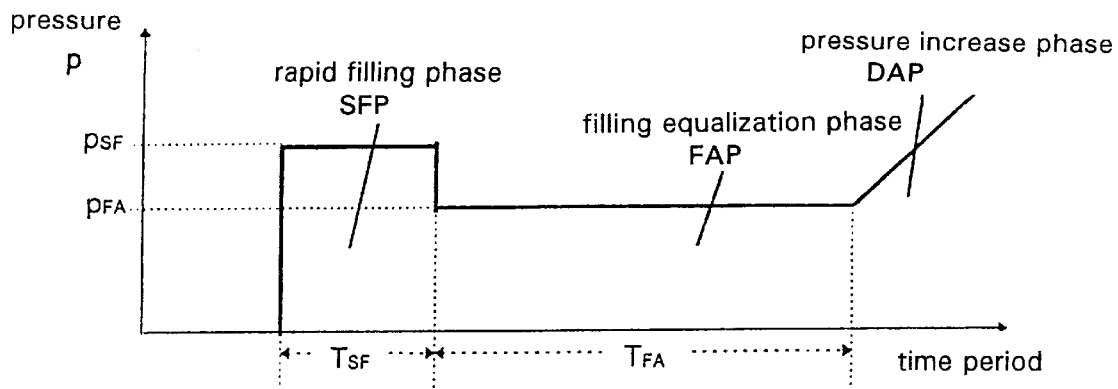
FIG. 1 is a diagram of a pressure curve through time with the phases of a filling.
Figure 2:
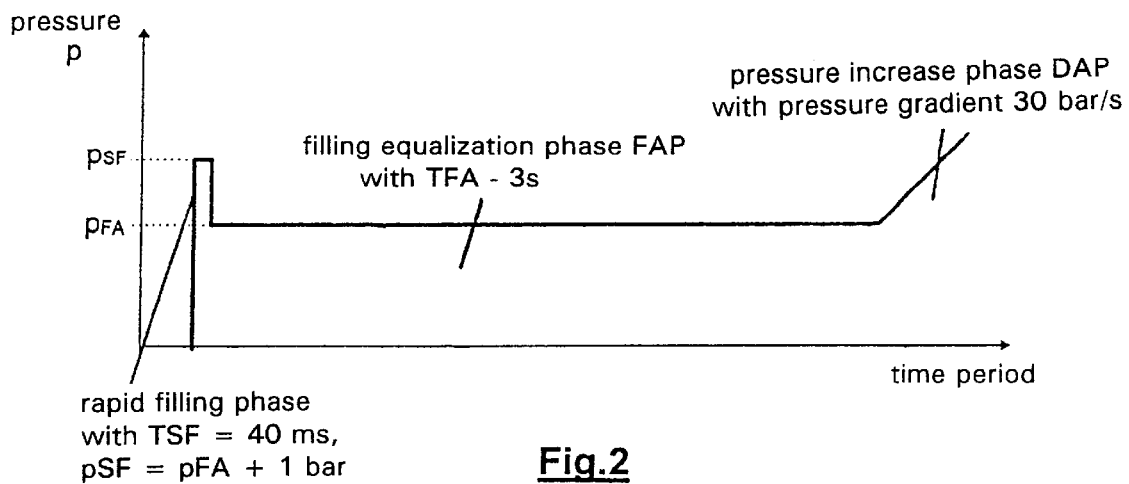
FIG. 2 is a standard for a pressure regulator current and is a theoretical pressure curve for determining an optimal filling equalization pressure.
Figure 3:
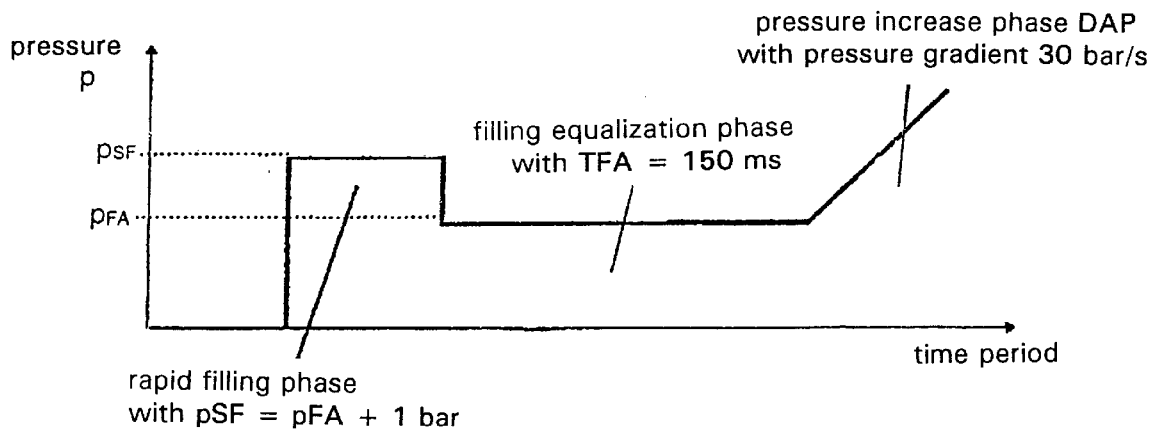
FIG. 3 is a standard for a pressure regulator current and is a theoretical pressure curve for determining an optimal rapid filling period.

Referring to FIG. 1 to 3, described herebelow is a process for the automatic coordination of the filling operation of hydraulically actuated shift elements wherein the process is exclusively based on parameters like the pressure regulator current periods and different speeds already known from the transmission control.

The filling operation of each shift element is described by four parameters, namely, rapid filling period T_SF, rapid filling pressure p_SF, filling equalization period T_FA and filling equalization pressure p_FA.

The filling and feeding operation of hydraulically actuated shift elements starts first with a rapid filling phase SFP followed by a filling equalization phase FAP. At the end of the filling equalization phase there follows a pressure increase phase DAP which can be reproduced as a pressure ramp increasing through time, as is to be understood from the figures.

Referring to FIG. 1, the generally known phases of a filling are reproduced in the form of a pressure curve dependent on time. With the start of the rapid filling phase SFP, a rapid filling pressure p_SF is applied which remains at least approximately constant during the whole rapid filling period T_SF. At the end of the rapid filling phase SFP, the pressure curve registers a step and continues with the constantly proceeding filling equalization pressure p_FA during the whole filling equalization phase FAP that follows, which corresponds to the filling equalization period T_FA. At the end of the filling equalization phase FAP there follows a constant pressure increase during the pressure increase phase DAP. The transition from the filling equalization phase FAP to the pressure increase phase DAP is characterized by a change of speed.

The shift element concerned is thus optimally filled at the end of the filling equalization phase FAP. If, as a consequence of tolerances determined by the manufacture, the piston space is already filled during the rapid filling phase SFP or in an earlier stadium of the filling equalization phase FAP, or if the filling operation has ended already during the pressure increase phase DAP, then the shifting operation proceeds jerkily, which is generally felt as a disturbance.

In order to optimize the shifting operation in the sense that the filling of the shift element terminates with the end of the filling equalization phase, the rapid filling period T_SF, the rapid filling pressure p_SF, the filling equalization period T_FA and the filling equalization pressure p_FA must be correspondingly optimized. To this end two of the four parameters mentioned are preset in order to determine an optimal value for the remaining two parameters p_FA,opt, T_FA,opt, p_SF,opt, T_SF,opt.

This optimization process for determining an optimal filling equalization pressure p_FA,opt and an optimal rapid filling period T_SF,opt is described below.

A condition for carrying out the process is that the rapid filling pressure p_SF and the filling equalization period T_FA be preset.

Besides, it is convenient to know from limiting sample tests lower and upper limiting values for the parameters p_FA, T_SF to be optimized. Said limiting values are established empirically in tests with the transmissions which have maximum tolerances or minimal tolerances and represent extreme values having an extremely poor operating quality. The lower limits of the respective parameters are designated p_FA,min, T_FA,min, p_SF,min and T_SF,min, with the empirically determined upper limits of the parameters accordingly bearing the designations p_FA,max, T_FA,max, p_SF,max and T_SF,max.

Another condition for carrying out the process is that the shift element, the filling parameters of which must be determined, can be individually controlled hydraulically or electrically. The individual controllability of the respective shift element is, therefore, a prerequisite since each shift element has its own tolerances and also must be optimally adjusted.

In addition, when said shift element is closed, a measurable speed change clearly coordinated with the shift element must result. The start of the speed change from the filling equalization phase FAP to the pressure increase phase DAP can be determined by a divergence of the speed from a mean value, or by the formation of a speed gradient, or by a combination of both. If, for example, a constant engine speed is preset, this determines a constant system pressure. If a change of speed now follows, a speed change clearly related thereto must appear on the shift element. To this end, the speed and the pressure regulator current must always be monitored.

Another added condition is to know by what amount the rapid filling pressure p_SF has to be above the filling equalization pressure p_FA. The difference between said pressures is determined with reference to previous tests and is expressed in the instant embodiment with 1 bar.

Likewise, another condition for carrying out the process has been established with the aid of previous tests, namely, how low the filling equalization period of the shift element has to be. In the instant embodiment, the filling equalization period T_FA has been determined to be 150 ms.

For carrying out the optimization process, the transmission temperature is first adjusted to a defined level. Thereafter the transmission is brought to a state such that when the shift element to be adjusted is closed, a measurable speed change appears. For this purpose other shift elements, for example, can be closed so that when the shift element to be adjusted is closed, a gear is introduced, a blocking occurs in the transmission, or a transmission element is driven at high speed. By opening the other shift elements, one side of the shift element to be adjusted is brought to a defined output speed. On the other side of the shift element upon which the preset pressure acts, the speed must be measurable.

In addition, the engine speed must be raised to the point such that any influence of the system pressure be eliminated when filling the shift element. For this purpose, the engine speed must be brought to a magnitude of more than 1,500 U/min, for example.

Referring to FIG. 2, for determining the filling equalization pressure p_FA, a theoretical pressure curve or pressure regulator current is now preset having a very short rapid filling phase SFP (substantially 40 ms) in order to adjust the hysteresis of the pressure regulator, like in a real shifting operation. The rapid filling pressure p_SF must be above the filling equalization pressure p_FA by 1 bar. For the filling equalization phase FAP a longer period of time of 3 s duration is assumed. The height of the filling equalization pressure p_FA to be optimized is variable.

The pressure ramp (or the pressure increase phase DAP) has a gradient of 30 bar/s corresponding to the quickest pressure ramps during shifts.

To determine the optimal filling equalization pressure p_FA,opt, a pressure regulator is now controlled according to the preset pressure regulator current of FIG. 2.

For the filling equalization phase or the current belonging thereto, an initial value p_FA,a is first established which is lower than the previously empirically determined lower limiting value p_FA,min. In this case, the speed change must take place after the start of the pressure increase phase DAP or pressure regulator current ramp. If during the transition from the filling equalization phase FAP to the pressure increase phase DAP or after the start of the pressure increase phase DAP, no speed change appears, the shift element or the control thereof is defective.

Therefore, depending on the parameters to be optimized, there is preset, independently of the embodiment described, an initial value p_FA,a, T_FA,a, p_SF,a, T_SF,a which is conveniently less than the respective empirically determined lower limiting value p_FA,min, T-FA,min, p_SF,min, T_SF,min. This is not an obligatory condition for carrying out the optimization process.

Referring again to the optimization of the filling equalization pressure p_FA of FIG. 2, the initial value p_FA,a of the filling equalization pressure is now gradually raised at intervals of 0.1 to 0.2 bar, the speed change occurring always earlier. At first the speed change still appears during the pressure increase phase DAP or pressure regulator current ramp, which means that the adjusted filling equalization pressure p_FA is still too low. At a certain filling equalization pressure p_FA,opt, the speed change occurs prior to or at the start of the pressure increase phase DAP before the pressure regulator current ramp. The filling equalization pressure is the pressure at which for the first time the speed change occurs at the start of the pressure increase phase or before.

If the determined optimal filling equalization pressure p_FA,opt is above the previously empirically determined upper limited value p_FA,max for the filling equalization pressure p_FA, then the shift element or the control thereof is possibly defective, and in any case outside the admissible tolerances.

The same in general applies when a determined optimal parameter p_FA,opt, T_FA,opt, p_SF,opt, T_SF,opt is above the corresponding empirically determined upper limiting value p_FA,max, T_FA,max, p_SF,max, or T_SF,max.

In addition to the preset parameters rapid filling pressure p_SF, filling equalization period T_FA, and the determined optimal filling equalization pressure p_FA, there must now be determined the optimal rapid filling period T_SF.

To this end, according to FIG. 3, there is preset a theoretical pressure curve or pressure regulator current having a rapid filling phase SFP of variable duration, a rapid filling pressure p_SF higher by 1 bar than the filling equalization pressure p_FA, a filling equalization phase (the filling equalization period of which amounts, for example, to T_FA 150 ms), and a pressure increase phase which has a pressure ramp with a gradient of 30 bar/s corresponding to the quickest pressure ramps in shifts.

With the preset parameters p_SF, T_FA and the determined optimal filling equalization pressure p_FA, opt, there is now first set an initial value T_SF which, in turn, is conveniently less than the empirically found lower limiting value T_SF,min. The speed change now must occur after the start of the pressure increase phase DAP, otherwise the shift element or the control thereof is defective.

Analogous to the above described determination of the optimal filling equalization pressure p_FA,opt, the value of the rapid filling period T_SF is gradually raised at intervals, the speed change always occurring earlier. The speed change still appears first during the pressure increase phase, which means that the adjusted rapid filling period T_SF is still too short. In a specific filling equalization period T_SF,opt, the speed change occurs simultaneously or approximately simultaneously with the start of the pressure increase phase DAP and thus constitutes the optimal filling equalization period for the shift element.

If the determined optimal rapid filling period T_SF is above the priorly empirically determined upper limiting value T_SF,max, it must be assumed that the shift element or the control thereof is possibly defective, and in any case outside the admissible tolerance.

Analogous to the process described above, it is possible, instead of optimizing the rapid filling period T_SF and the filling equalization pressure p_FA, to optimize the rapid filling pressure p_SF and filling equalization period T_FA parameters.

In vehicle inspections this process is conveniently carried out with blocked or stationary output. The process can thus be used both on a transmission inspection bench after manufacture on the belt immediately after the production of the transmission and also in inspections of a passenger car in the workshop.

However, in another embodiment, the process obviously can be carried out with operating transmission output, for example, while driving.

What is claimed is:

1. A process for automatically coordinating the filling and feeding operation of hydraulically operated and hydraulically or electronically individually commanded shift elements, the filling and feeding operation of which takes place according to a time-dependent pressure curve with a rapid filling phase (SFP), a filling equalization phase (FAP) and a pressure increase phase (DAP) and as parameters are used at least a rapid filling time (T_SF), a rapid filling pressure (p_SF), a filling equalization period (T_FA) and a filling equalization pressure (p_FA), characterized in that to optimize the parameters (T_SF, p_SF, T_FA, p_FA), two parameters are preset and for the other two parameters within a time-dependent pressure curve, an optimal value (p_FA,opt, T_FA,opt, p_SF,opt, T_SF,opt) of the first parameter to be optimized is determined in a manner such that based on an appropriate presettable initial value (p_FA, a, T_FA,a, p_SF,a, T_SF,a), said value is changed gradually until a speed change occurs with the start of the pressure increase phase (DAP) and the other parameter to be optimized is determined by gradually changing it at the optimal value (p_FA,opt, T_FA,opt, p_SF,opt, T_SF,opt) of the first parameter to be optimized and based on the appropriate presettable initial value (p_FA,a, T_FA,a, p_SF,a, T_SF,a) until a speed change occurs at least approximately simultaneously with the start of the pressure increase phase DAP.

2. The process according to claim 1, wherein the presettable initial values (P_FA,a, T_FA,a, p_SF,a, T_SF,a) are each empirically determined limiting values (p_FA,max, T_FA,max, p_SF,max, T_SF,max).

3. The process according to claim 1 wherein the shift element or the control thereof is detected to be defective when a) while increasing a parameter value for determining the respective optimal value (p_FA,opt, T_FA,opt, p_SF, opt, T_SF,opt) after start of the pressure increase phase (DAP), no speed change occurs and/or b) the determine optimal value (p_FA,opt, T_FA,opt, p_SF,opt, T_SF,opt) is outside a respective empirically determined tolerance range (p_FA,min, T-FA,min, p_SF,min, T_SF,min).

4. The process according to claim 1 wherein when the respective shift element is closed, a measurable speed change clearly coordinatable with said shift element occurs.

5. The process according to claim 1 wherein the speed change is detected by a divergence of the speed from a mean value and/or by formation of a speed gradient.

6. The process according to claim 1 wherein said parameters (T_SF, p_SF, T_FA, p_FA) are optimized at a defined transmission temperature.

7. The process according to claim 1 wherein the preset two of the four parameters (T_SF, p_SF, T_FA, p_FA) are empirically determined.

8. The process according to claim 1 wherein the value of said rapid filling pressure (p_SF) is selected so as to be above the filling equalization pressure (p_FA) by a predefined amount.

9. The process according to claim 1 wherein for optimizing the parameters (T_SF, p_SF, T_FA, p_FA), the speed of an engine interacting with the shift elements is raised until an influence of the system pressure is eliminated.

10. The process according to claim 1 wherein a transmission output interacting with the shift elements is blocked during the optimization of the parameters.

* * * * *